United States Patent Office.

ROBERT M. LIVINGSTON, OF MOBILE, ALABAMA.

*Letters Patent No.* 65,494, *dated June* 4, 1867; *reissue No.* 2,720, *dated August* 6, 1867.

IMPROVED COMPOSITION OR PASTE FOR ARTICLE OF FOOD.

The Schedule referred to in these Letters Patent and making part of the same.

Be it known that I, ROBERT M. LIVINGSTON, of the city and county of Mobile, and State of Alabama, have originated a new and useful Compound or Paste, of which cheese is the basis, and which I term "Cacio di Maccaroni," (or Cheese Maccaroni) the nature or production of which may be understood from the following description and mode of preparing the same, viz: To thirty-two (32) parts of cheese I add five (5) parts of olive or other proper oil, two (2) parts of mustard or any other suitable ingredient, one and a half (1½) parts of salt, one (1) part of pepper-vinegar, and eight (8) parts of pulverized biscuit. The whole are intimately mixed and ground into a paste or compound, and these operations of mixing and of grinding are performed by any method or machinery adapted to such purposes.

*Claim.*

What I claim as my invention, and desire to secure by Letters Patent, is—

A compound or paste of which cheese is the basis, and the admixture of any suitable seasoning or flavoring ingredients, in the manner and for the purpose specified, whether in the ratio described, or in any other substantially the same.

ROBT. M. LIVINGSTON.

Witnesses:

JNO. P. REMY,

WILLIAM T. AYERS.